US011931876B2

(12) United States Patent
Wang et al.

(10) Patent No.: US 11,931,876 B2
(45) Date of Patent: Mar. 19, 2024

(54) POWER TOOL

(71) Applicant: Nanjing Chervon Industry Co., Ltd., Nanjing (CN)

(72) Inventors: Xiaoyong Wang, Nanjing (CN); Xiuhuan Xue, Nanjing (CN); Hongtao Ke, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/841,843

(22) Filed: Jun. 16, 2022

(65) Prior Publication Data

US 2023/0009091 A1 Jan. 12, 2023

(30) Foreign Application Priority Data

Jul. 8, 2021 (CN) ......................... 202110772292.0

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 4,667,749 A * 5/1987 Keller ..................... B25F 5/006 267/140.13
5,640,741 A * 6/1997 Yano ......................... B25F 5/02 16/DIG. 12
5,692,574 A * 12/1997 Terada ................. B25D 17/043 173/162.2
6,026,910 A * 2/2000 Masterson .............. B25F 5/006 267/141.1
8,167,054 B2 * 5/2012 Nakashima ............ B25D 17/24 173/162.1
8,240,395 B2 * 8/2012 Kamegai ................ B25D 17/04 173/162.1
8,496,073 B2 * 7/2013 Eisenhardt ............. B25F 5/006 173/162.1
9,387,578 B2 * 7/2016 Kuehne ................... B24B 23/02
9,782,885 B2 * 10/2017 Yoshikane .............. B25F 5/006
9,868,200 B2 * 1/2018 Lutz ....................... B23Q 17/00
10,040,187 B2 * 8/2018 Hess ..................... B24B 41/007
10,179,400 B2 * 1/2019 Furusawa ............... B25F 5/026
10,569,406 B2 * 2/2020 Aoki ......................... B25F 5/02
10,751,868 B2 * 8/2020 Tada .................... B25D 17/043
2005/0155778 A1 * 7/2005 Ishida ..................... B25F 5/006 173/217
2006/0156859 A1 * 7/2006 Nemetz .................. B25D 17/24 74/606 R (Continued)

*Primary Examiner* — Anna K Kinsaul
*Assistant Examiner* — Lucas E. A. Palmer
(74) *Attorney, Agent, or Firm* — Greenberg Traurig, LLP

(57) ABSTRACT

A power tool has a housing, which includes a first housing and a second housing. The second housing is configured with a connecting hole, a first connecting part passing through the connecting hole connecting the first housing and the second housing, a protective layer, arranged on a surface of the second housing, an elastic portion, connected with the protective layer, arranged between the first housing and the second housing, and is integrally formed with the protection layer.

20 Claims, 7 Drawing Sheets

(56) References Cited

U.S. PATENT DOCUMENTS

2007/0044984 A1* 3/2007 Fischer .................. B25F 5/006 173/217
2007/0281272 A1* 12/2007 Rahbari .................. A61C 3/00 433/141
2008/0032190 A1* 2/2008 Furuta ................ H01M 50/244 429/163
2010/0095533 A1* 4/2010 Takahashi .............. B26B 15/00 30/228
2010/0181085 A1* 7/2010 Imada ...................... B25F 5/02 173/162.2
2011/0120740 A1* 5/2011 Moreno ................ B25D 17/24 173/162.2
2011/0303721 A1* 12/2011 Miescher ................. B25F 5/02 227/110
2012/0073847 A1* 3/2012 Nagasaka ................ B25F 5/02 173/217
2013/0081839 A1* 4/2013 Tully ....................... B25F 5/02 137/115.18
2013/0277079 A1* 10/2013 Tsuzuki ................. B25F 5/006 173/162.2
2014/0014385 A1* 1/2014 Kosugi .................... B25F 5/02 173/217
2014/0102742 A1* 4/2014 Eshleman ............ B25B 21/004 173/183
2015/0196363 A1* 7/2015 Aman ................... A61B 50/33 53/425
2016/0310134 A1* 10/2016 Contini ............. A61B 17/0686
2017/0225316 A1* 8/2017 Iwakami .................. B25F 5/02
2018/0001444 A1* 1/2018 Matsushita ............ B25B 23/18
2019/0358769 A1* 11/2019 Miyazawa ............. B24B 47/12
2020/0215679 A1* 7/2020 Tamura .................... B25F 5/02
2020/0384597 A1* 12/2020 Numata ................. B25F 5/026
2021/0086276 A1* 3/2021 Ling ..................... B25D 17/24
2021/0184393 A1* 6/2021 Hiller ................. H01R 13/5202
2022/0055197 A1* 2/2022 Yoshikane .......... B25D 16/006
2022/0176511 A1* 6/2022 Greitmann ........... B24B 23/005
2022/0305634 A1* 9/2022 Takata ..................... B25F 5/02
2023/0041828 A1* 2/2023 Takahashi ............. A01G 3/053
2023/0044008 A1* 2/2023 Miyazawa ............... B25F 5/02

* cited by examiner

POWER TOOL

CROSS-REFERENCE TO RELATED APPLICATION

This application claims priority to Chinese Patent Application No. 202110772292.0 filed on Jul. 8, 2021, the disclosure of which is incorporated herein by reference in its entirety.

BACKGROUND

Hand-held power tools, such as impact wrenches, drilling machines, angle grinders, etc., need to be installed separately due to the different types of components in each element. Therefore, the corresponding housings are also assembled together by multiple housing elements. In some types of power tools, there are higher anti-vibration requirements for tools, which results in higher requirements for a damping structure within the assembly of multiple housings.

SUMMARY

A power tool includes: a housing including a first housing and a second housing, a connecting hole that includes hole is provided in the second housing; wherein the power tool further includes: a first connecting part connecting the first housing and the second housing through the connecting hole; a protective layer arranged on a surface of the second housing; and an elastic portion connected with the protective layer, wherein the elastic portion is arranged between the first housing and the second housing and is integrally formed with the protective layer.

In some examples, a collar is provided at the bottom end of the first housing, the collar is sleeved on the connecting hole and the elastic portion is provided between the collar and the connecting hole.

In some examples, the elastic portion includes a first elastic portion and a second elastic portion, the first elastic portion is arranged between the collar and the connecting hole, and the second elastic portion is arranged on two sides of the collar.

In some examples, a hard rubber ring is configured between the elastic portion and the connecting hole.

In some examples, the elastic portion and the protective layer are formed by injection molding.

In some examples, the elastic portion and the protective layer are made of Thermoplastic Elastomer.

In some examples, the Shore A Hardness number of the protective layer and the elastic portion are between 50 and 75.

In some examples, the second housing includes a connecting portion and a handle, the first connecting portion is connected to the first housing through the connecting portion; the protective layer includes a first protective layer and a second protective layer, wherein the first protective layer is provided on the surface of the connecting portion, and the second protective layer is provided on the surface of the handle.

In some examples, the first protective layer and the elastic portion are integrally formed.

In some examples, a limiting wall is arranged on the outer side of the connecting hole and is spaced from the limiting wall, and the limiting wall surrounds at least a portion of the connecting hole.

DETAILED DESCRIPTION

The present disclosure will be described in detail below with reference to the accompanying drawings.

Figure 1:
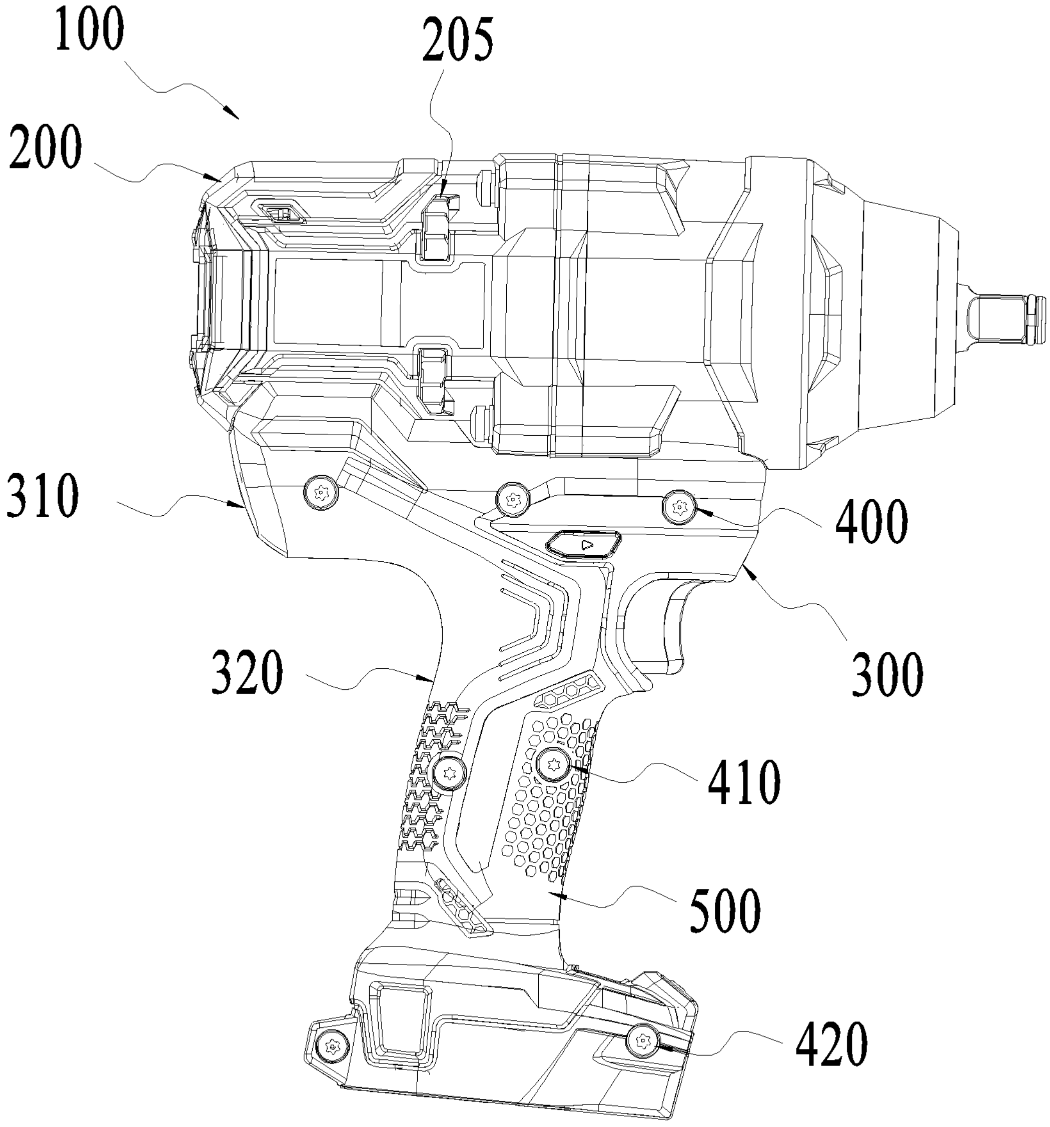
FIG. 1 is a front view of a power tool of the present disclosure.

As shown in FIG. 1, a power tool 100 of the present disclosure is illustrated. Specifically, the power tool 100 is a hand-held power tool, which may be a power drill, a wrench, an impact drill, a power hammer, a power breaker, etc. The power tool 100 in the example of the present disclosure is a hand-held impact wrench. Meanwhile, although the present example refers to a hand-held power tool, it should be understood that the present disclosure is not limited to the disclosed example, and that the present disclosure may also be applied to other types of power tools.

As shown in FIG. 1, the power tool 100 includes a first housing 200 and a second housing 300. The first housing 200 is disposed above the second housing 300. The first housing 200 is configured with a driving device or a transmission unit and so on. That is, the first housing 200 may be a housing of the motor, a housing of the gearbox, or a housing used all together by the motor and the gearbox. There is no restriction herein. One end of the first housing 200 is configured with a tool head in transmission connection with the driving device. As shown in FIG. 1, the up and down directions defined in this example are based on the upright state of the power tool 100 when it is in operation. In one example, the tool head is used for torque output. In one example, the tool head is used for impact force output.

Figure 2:
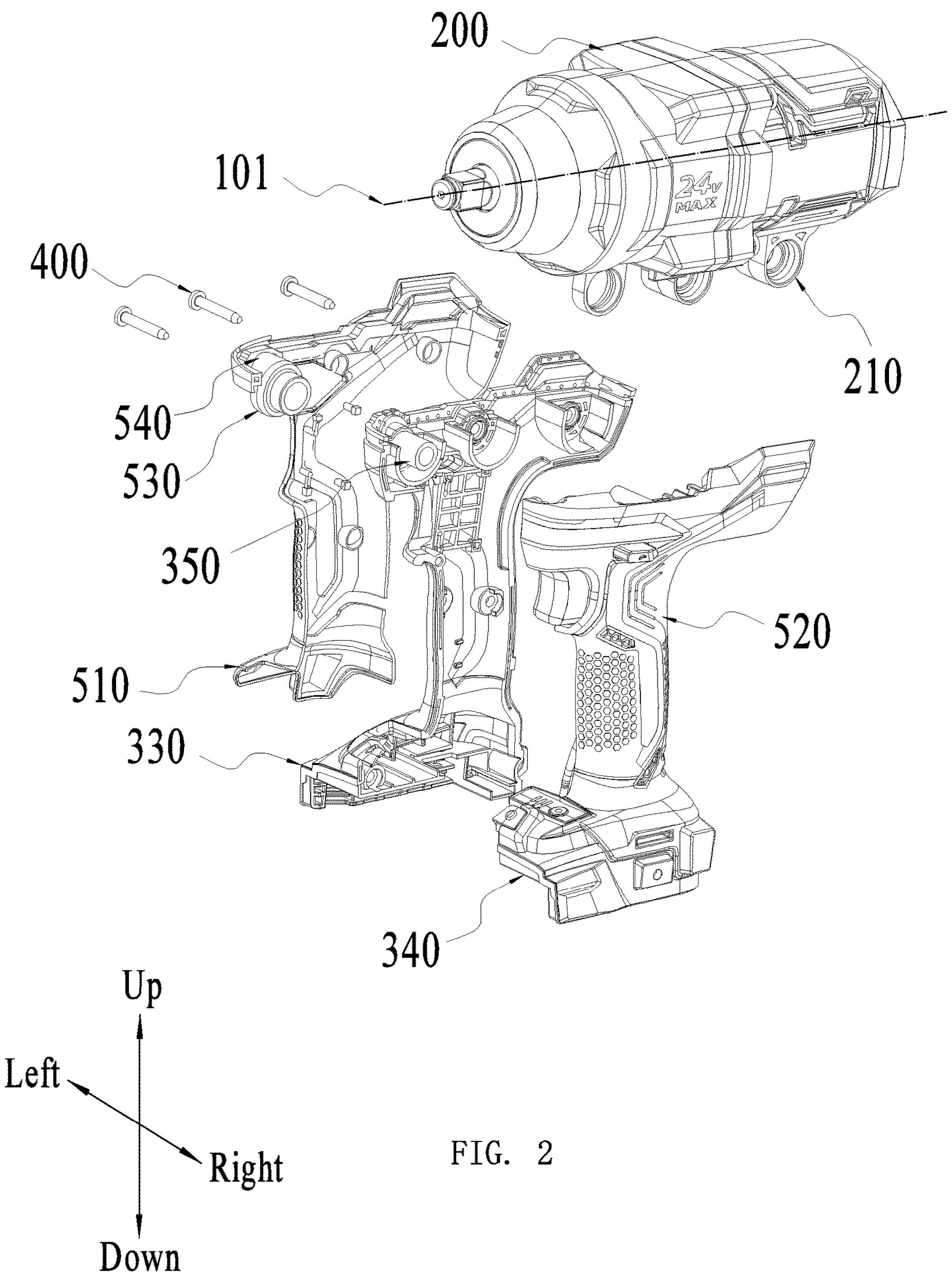
FIG. 2 is an exploded structural schematic view of a housing and a protective layer of the present disclosure.
Figure 3:
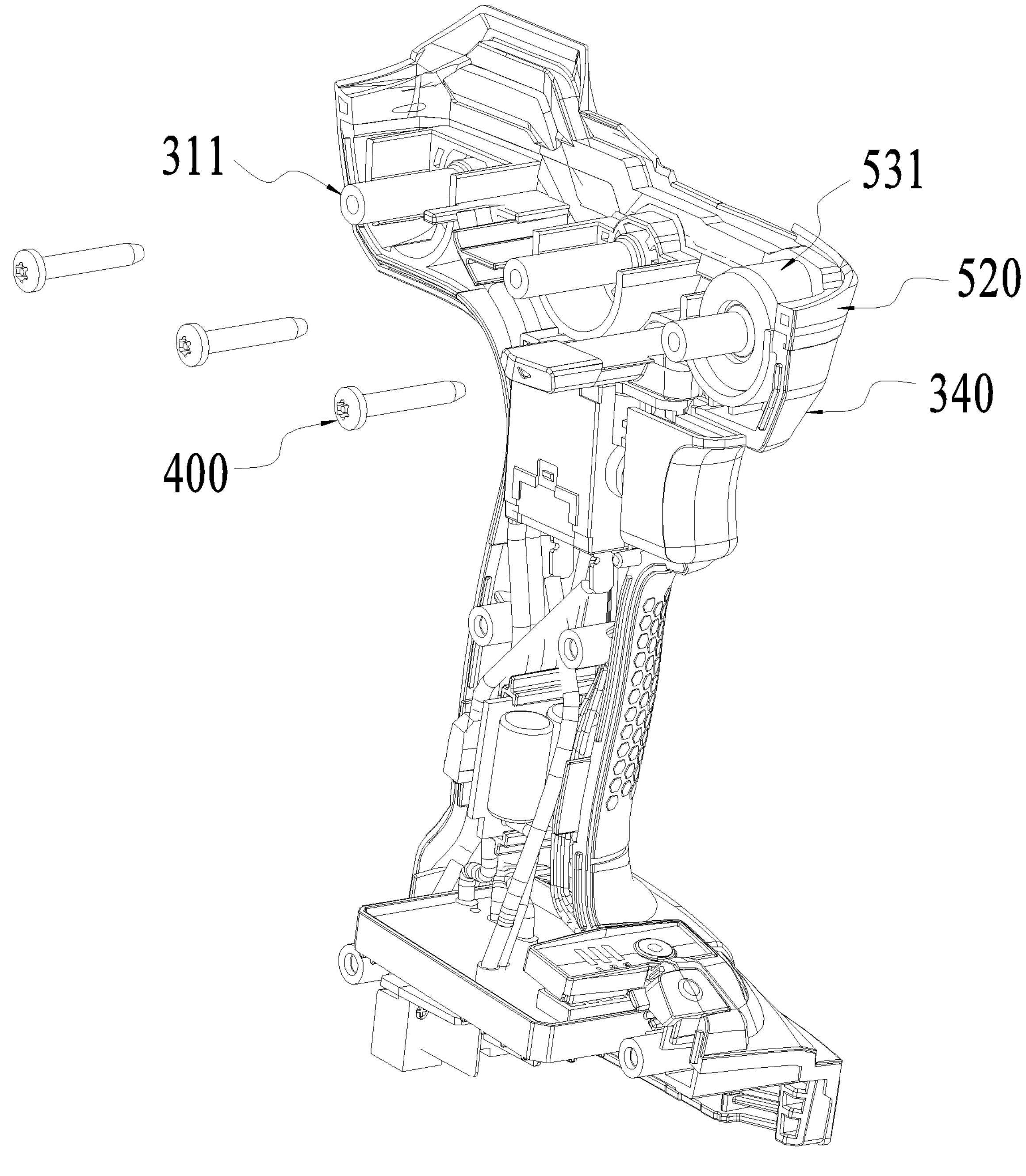
FIG. 3 is a structural schematic view of a right housing according to an example of the present disclosure.

As shown in FIGS. 1 to 3, there is a collar 210 on the lower end of the first housing 200. The collar 210 is a frame-shaped structure with a through hole in the center, and the outer side of the collar 210 may be cylindrical or cubic. The number of the collar 210 is at least two. Specifically, the first housing 200 in this example includes three collars. The collar 210 is used to connect the first housing 200 and the second housing 300. A first connecting part 400 and a connecting hole 311 pass through the through hole of the collar 210. In this example, the first housing 200 is an assembled structure composed of a plurality of housings. Especially when the housing includes a left housing and a right housing, the collar is divided to be a left collar and a right collar arranged adjacently. The collars are set corresponding to the first housing 200. The collar will be adjusted accordingly if the first housing adopts other assembled forms.

The second housing 300 includes a connecting portion 310 and a handle 320. The connecting portion 310 is located above the handle 320 and is connected to the first housing 200 through the first connecting part 400. In this example, the first housing 200 is a cylindrical housing extending horizontally. The connecting portion 310 is housing adapted to the shape of the first housing 200 and the connecting portion 310 extends horizontally. Since the handle 320 is a vertically extending housing, an upper portion of the connecting portion 310 is configured to adapt to the horizontal first housing 200, and a lower portion of the connecting portion 310 is configured to adapt to an upper end of the handle vertically arranged. Specifically, the connecting portion 310 is a variable diameter structure. The connecting portion 310 is disposed in middle and rear sections of the first housing, and the front and rear directions are for the tool head. That is, the connecting portion 310 extends from the middle of the first housing 200 to the direction away from the tool head. This structure prevents the position of the housing from hindering the working of the tool head. The handle 320 is located in the middle of the power tool 100 to ensure the center of gravity of the power tool 100 is located in the middle. Combining the position of the connecting portion 310, user's feeling of hand when operating the tool is ensured.

As shown in FIGS. 2 to 5, the second housing 300 is a left housing 330 and a right housing 340 that are connected to each other. In this example, the left housing 330 and the right housing 340 are two half housings that are symmetric about a vertical plane where a central axis 101 is located. A first connector 400 connects the first housing 200 and the second housing 300, and also connects the left housing 330 and the right housing 340.

In this example, the first connecting part 400 is a bolt. Correspondingly, the left housing 330 is configured with a bolt hole 314, and an inner side of the right housing 340 is configured with a connecting hole 311, and the connecting hole 311 is a protruding sleeve structure. The bolts pass through the bolt holes 314 and enter the connecting holes 311, accomplish the connection between the second housing 300 and the first housing 200, and connect the left and right housings at the same time. The second housing 300 is further configured with a second connecting portion 410 and a third connecting portion 420, connecting a middle and a low portion of the left and right housings respectively.

Figure 4:
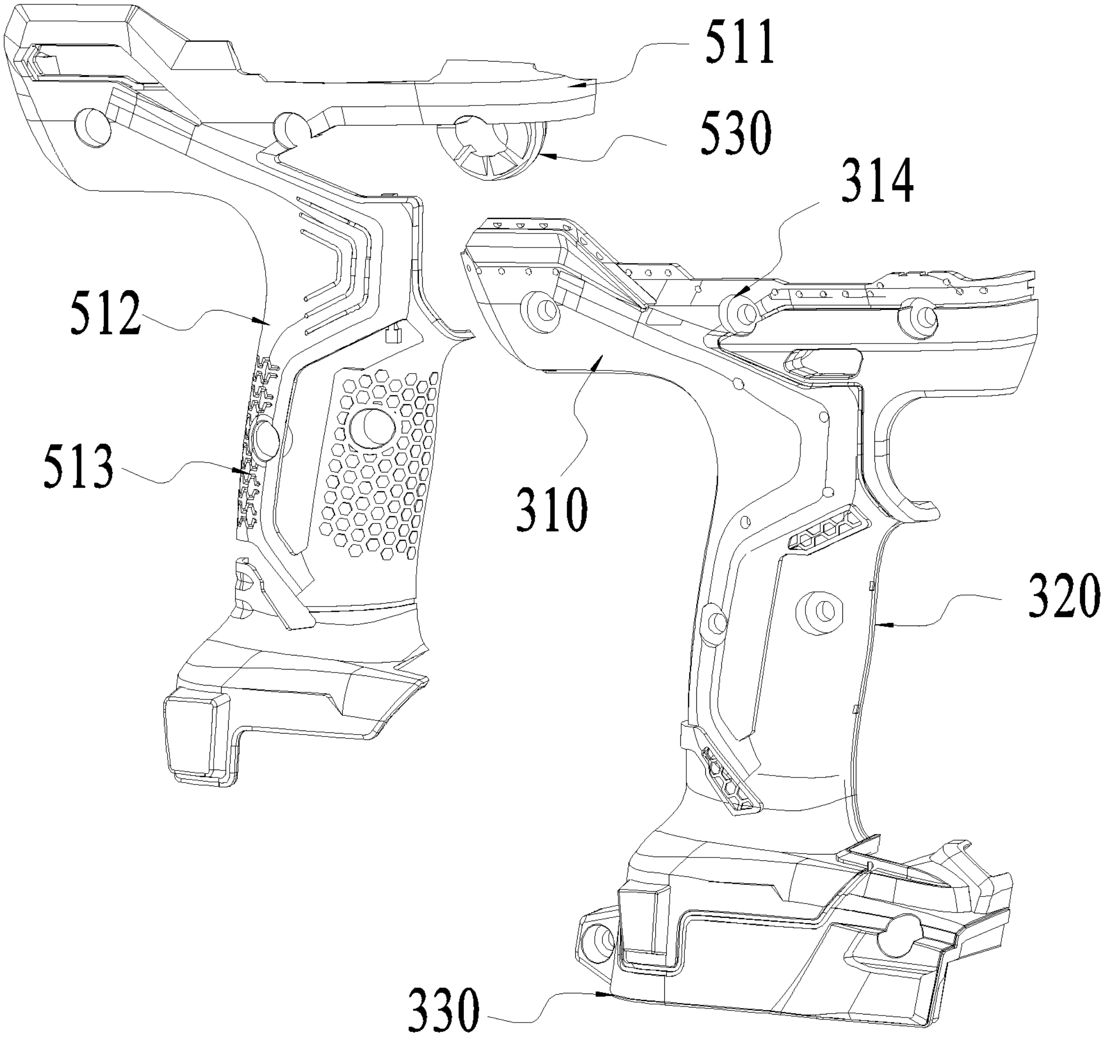
FIG. 4 is a structural schematic view of a left housing and the protective layer according to an example of the present disclosure.

As shown in FIG. 2 and FIG. 4, a protective layer 500 is further provided on a surface of the second housing 300. The protective layer 500 covers an outer surface of the second housing 300. An elastic portion 530 is connected with the protective layer 500 and is positioned between the first housing 200 and the second housing 300. The elastic portion 530 and the protective layer 500 are integrally formed. The protective layer 500 includes two portions disposed on the left housing 330 and the right housing 340, namely, a left protective layer 510 and a right protective layer 520.

Figure 5:
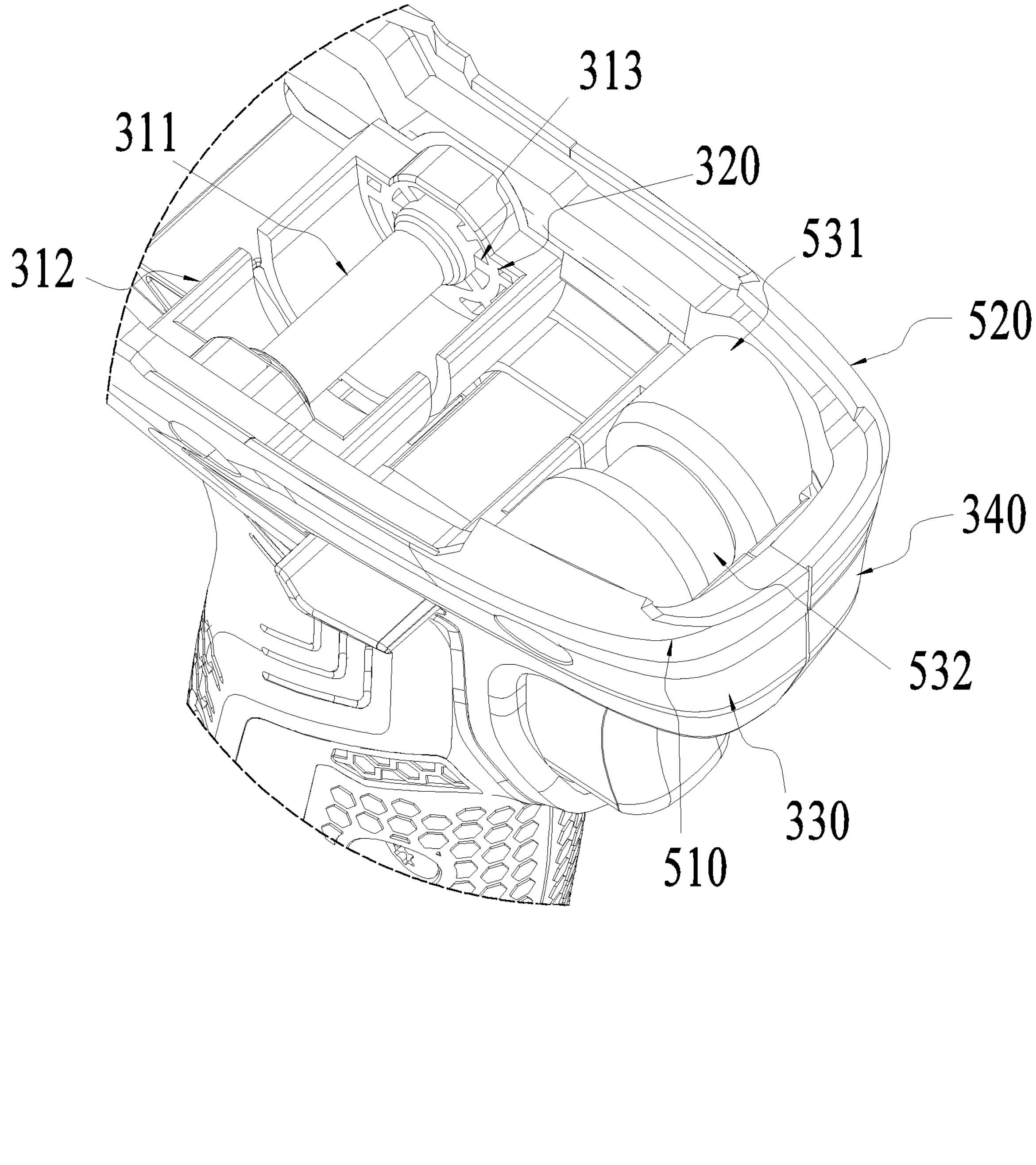
FIG. 5 is a schematic view of the internal structure of the second housing of the present disclosure.

The elastic portion 530 includes two portions disposed on the left housing 330 and the right housing 340, namely a left elastic portion and a right elastic portion. The left and right elastic portions are integrally formed with the left and right protective layers respectively. Wherein, as shown in FIG. 5, the elastic portion 530 includes a first elastic portion 531 and a second elastic portion 532. There are at least two first elastic portions 531 disposed on two sides of the second elastic portion 532 respectively. The diameter of the second elastic portion 532 is smaller than the diameter of the first elastic portion 531, so that the collar 210 is disposed outside the second elastic portion 532. That is, a surface of the through hole of the collar 210 abuts against an outer surface of the second elastic portion 532, and top and bottom surfaces of the collar 210 abut against the surface of the first elastic portion 531. In this example, the second elastic portion 532 and the first elastic portion 531 on the same side are integrally formed and are further integrally formed with the left protective layer 510. At this time, the elastic portion of the right protective layer 520 only includes one first elastic portion 531. In other examples, the second elastic portion 532 is integrated with the first elastic portion 531 on the opposite side, which is opposite to the above example. Alternatively, there are two second elastic portions 532 integrally formed with the first elastic portions 531 on both sides respectively, and forms two completely symmetrical stepped structures. There is no limitation herein.

The elastic portion 530 is disposed on an inner surface of the second housing 300. The protective layer 500 is disposed on an outer surface of the second housing 300. And the elastic portion 530 and the protective layer 500 are integrally formed. There is also a bending portion 540 between the elastic portion 530 and the portion located out of the housing of the first protective layer 511. The bending portion 540 surrounds at least a portion of or all of an upper edge of the second housing 300, and the bending portion 540 is disposed at a portion where the first housing 200 the second housing 300 contact. That is, when assembling, the first housing 200 is directly placed on the bending portion 540. In other examples, when the protective layer 500 is integrally formed, there may not be the bending portion 540. That is, using the bolt holes 314 to accomplish the connection between the elastic portions and the protective layer on the inner and outer surfaces.

The above-mentioned integral molding process is injection molding and can also be other types of integral molding processes. There is no limitation herein. The material of the protective layer 500 is thermoplastic elastomer (TPE) and a Shore A hardness of the material ranges from 50 to 75, and in one example, from 60 to 65. Appropriate hardness can ensure the elastic portion to have better damping elasticity and service life. Since the elastic portion and the protective layer are integrally formed, the protective layer can be ensured to have a good protection effect and a good gripping feeling.

The protective layer 500 disposed on the outer surface of the second housing 300 further includes a first protective layer 511 and a second protective layer 512. The first protective layer 511 covers at least parts of the connecting portion 310 of the second housing 300, and the second protective layer 512 covers at least a portion of the handle 320. The first protective layer 511 and the second protective layer 512 are connected and integrally formed. In other examples, the first protective layer 511 and the second protective layer 512 are separated from each other and are integrally formed separately. At this time, the first protective layer 511 is integrally formed with the elastic portion 530. The second protective layer 512 is further configured with a resistance area 513. The resistance area 513 is in raised pattern to increase the resistance when users holding the tool, and also prevent the sliding that may occur when holding the tool. Specifically, the resistance area 513 may be provided on front and rear sides of the handle 320, or around the handle for a circle.

Figure 6:
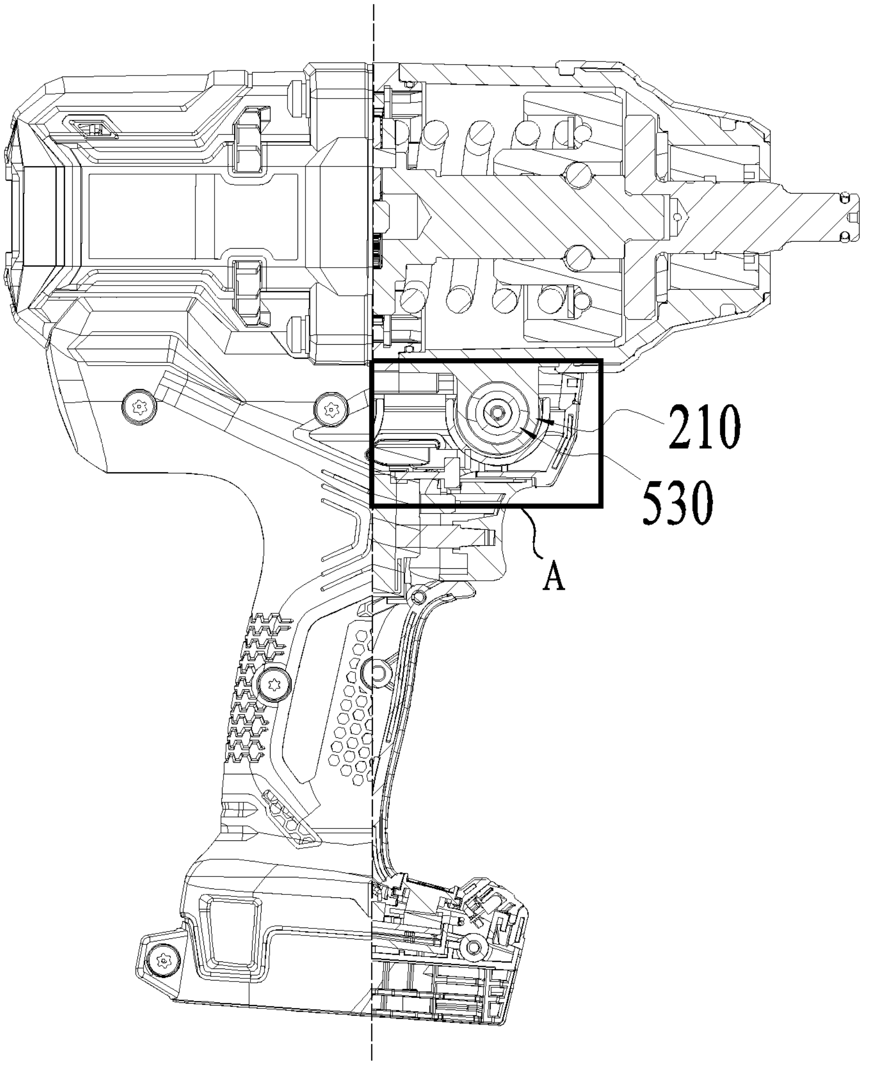
FIG. 6 is a half-section schematic diagram of FIG. 1.
Figure 7:
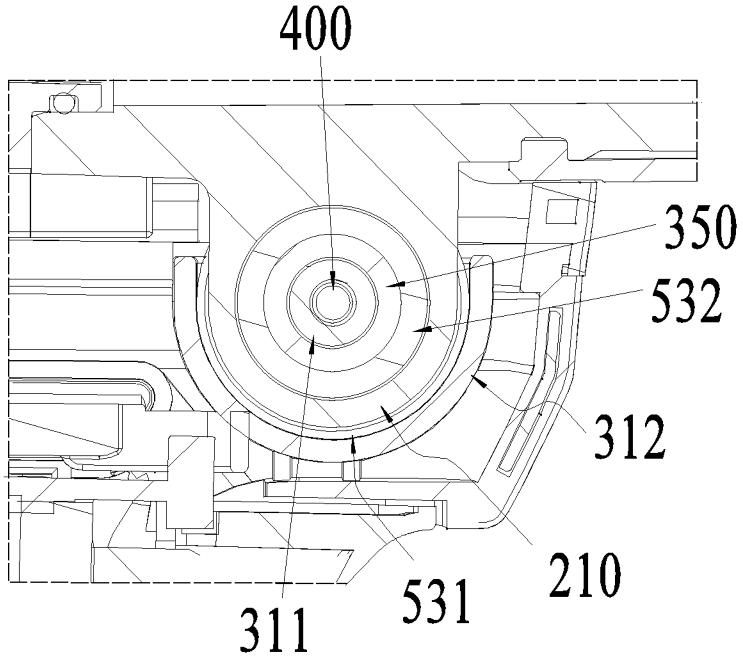
FIG. 7 is a partial enlargement schematic view of position A in FIG. 6.

As shown in FIGS. 5 to 7, an inner surface of the connecting portion 310 is further configured with a limiting wall 312. The limiting wall 312 partially surrounds the connecting hole 311 and has a certain space with the connecting hole 311. The elastic portion 530 is arranged in the space. Since the second housing is divided into left and right halves, the corresponding limiting walls 312 are also symmetrically set with a left and a right limiting wall 312 relative to the vertical plane where the central axis 101 is located. The length of the connecting hole 311 is approximately the sum of the depths of two limiting walls. When the left housing 330 and the right housing 340 are connected, an end of the connecting hole of one housing just leans against the inner surface of the other housing. At the same time, there may be a small gap between two limiting walls 312, or the two limiting walls 312 completely abut each other.

As shown in FIGS. 2 and 7, the inner surface of the connecting portion 310 is further configured with a hard rubber ring 350, which is sleeved on an outside of the connecting hole 311. When the left and right housings are connected, connecting holes are aligned and inserted into the hard rubber ring, and this structure is convenient for the production and assembly of the housings. In other examples, the hard rubber ring 350 is disposed on the same side of the connecting hole 311. That is, the hard rubber ring 350 is sleeved on the connecting hole 311 before the left and right housings connecting. The hard rubber ring 350 is made of hard rubber material. The hardness of the hard rubber ring 350 is between the hardness of the elastic portion and the housing. The hard rubber ring 350 is configured to make the elastic portion easier to adhere to a designated position during injection molding.

As shown in FIG. 7, there is a certain gap between the assembled collar 210 and the limiting wall 312, which allows there to be vibration amplitude between the first housing 200 and the second housing 300 when the power tool is on operation. The vibration amplitude is offset by the elastic portion 530 in the limiting wall 312.

As shown in FIG. 5, the inner surface of the connecting portion 310 is further configured with a grid area 313. Specifically, the grid area 313 is arranged at an end of the limiting wall 312, and the plane where the grid area 313 is located is perpendicular to the depth direction of the limiting wall 312, that is, perpendicular to the extending direction of the connecting hole 311. When the left and right housings are connected, the grid areas 313 are located at both ends of the connecting hole 311. That is, the grid areas 313 are at the bottom of the two first elastic portions 531. The grid area 313 can be honeycomb, square grid or similar structure with bumps and depressions, to increase the adhesion effect between the elastic portion injection molded and the housing.

As shown in FIG. 3, the handle 320 is configured with a switch assembly and a circuit assembly in sequence from top to bottom. In this example, the end of the handle 320 is also configured with a battery pack base, which is used for connecting with a detachable battery pack. In other examples, the handle is configured with a power cord to connect external alternating current.

The advantages of the present disclosure are: the power tool of the present disclosure can reduce the vibration between the first housing and the second housing, protect the internal structure of the tool, and improve the service life. The present disclosure simplifies the production process, improves efficiency of tool production and assembly. The elastic portion and the protective layer are integrally formed, and there are lower requirement for deviation, so that better damping effect can be configured.

The foregoing has shown and described the basic principles, main features, and advantages of the present disclosure. Those skilled in the art should understand that the above-mentioned examples do not limit the present disclosure in any form, and all technical solutions obtained by means of equivalent replacement or equivalent transformation fall within the protection scope of the present disclosure

What is claimed is:

1. A power tool, comprising:

a housing comprising a first housing and a second housing, wherein the second housing has a connecting hole, and a collar provided on the first housing;

a first connecting part connecting the first housing and the second housing through the connecting hole;

a protective layer arranged on a surface of the second housing; and an elastic portion connected with the protective layer, wherein the elastic portion is arranged between the first housing and the second housing and is integrally formed with the protective layer, and the collar is sleeved on the connecting hole, and the elastic portion is provided between the collar and the connecting hole.

2. The power tool according to claim 1, wherein the collar is provided at a bottom end of the first housing.

3. The power tool according to claim 2, wherein the elastic portion comprises a first elastic portion and a second elastic portion, the first elastic portion is arranged between the collar and the connecting hole, and the second elastic portion is arranged on two sides of the collar.

4. The power tool according to claim 1, wherein a hard rubber ring is configured between the elastic portion and the connecting hole.

5. The power tool according to claim 1, wherein the elastic portion and the protective layer are formed by injection molding.

6. The power tool according to claim 5, wherein the elastic portion and the protective layer are made of a thermoplastic elastomer.

7. The power tool according to claim 1, wherein a Shore A Hardness number of the protective layer and the elastic portion are between 50 and 75.

8. The power tool according to claim 1, wherein the second housing comprises a connecting portion and a handle, the first connecting portion is connected to the first housing through the connecting hole; the protective layer comprises a first protective layer and a second protective layer, wherein the first protective layer is provided on the surface of the connecting portion, and the second protective layer is provided on the surface of the handle.

9. The power tool according to claim 8, wherein the first protective layer and the elastic portion are integrally formed.

10. The power tool according to claim 1, wherein a limiting wall is arranged on an outer side of the connecting hole and is spaced from the limiting wall and the limiting wall surrounds at least a portion of the connecting hole.

11. The power tool according to claim 1, wherein the surface of the second housing is an outer surface of the second housing.

12. A power tool, comprising:

a housing comprising a first housing and a second housing, and a collar provided on the first housing;

a protective layer arranged on a surface of the housing; and an elastic portion connected with the protective layer, wherein the elastic portion is arranged between the first housing and the second housing and is integrally formed with the protective layer, and the collar is sleeved on a connecting hole of the second housing and the elastic portion is further arranged between the collar and the connecting hole.

13. The power tool according to claim 12, wherein a first connecting part connecting the first housing and the second housing through the connecting hole.

14. A power tool, comprising:

a housing comprising a first housing and a second housing;

a motor;

a tool head for torque and/or force output;

a driving device connected with the motor and driving the tool head to work;

a protective layer arranged on a surface of the housing; and an elastic portion connected with the protective layer;

wherein the elastic portion is arranged between the first housing and the second housing and is integrally formed with the protective layer, and the elastic portion is provided between a collar formed on the first housing and a connecting hole formed on the second housing, wherein the collar is sleeved on the connecting hole.

15. The power tool according to claim 14, wherein a hard rubber ring is configured between the elastic portion and the connecting hole.

16. The power tool according to claim 14, wherein a first connecting part connecting the first housing and the second housing through the connecting hole.

17. The power tool according to claim 14, wherein the elastic portion and the protective layer are formed by injection molding.

18. The power tool according to claim 14, wherein the elastic portion and the protective layer are made of a thermoplastic elastomer.

19. The power tool according to claim 14, wherein a Shore A Hardness number of the protective layer and the elastic portion are between 50 and 75.

20. The power tool according to claim 14, wherein the surface of the second housing is an outer surface of the second housing.

* * * * *